United States Patent
Huber et al.

(10) Patent No.: US 12,073,582 B2
(45) Date of Patent: Aug. 27, 2024

(54) METHOD AND APPARATUS FOR DETERMINING A THREE-DIMENSIONAL POSITION AND POSE OF A FIDUCIAL MARKER

(71) Applicant: THE BOEING COMPANY, Chicago, IL (US)

(72) Inventors: David James Huber, Malibu, CA (US); Deepak Khosla, Malibu, CA (US); Yang Chen, Malibu, CA (US); Brandon Courter, North Charleston, SC (US); Luke Charles Ingram, North Charleston, SC (US); Jacob Moorman, Los Angeles, CA (US); Scott Rad, Santa Monica, CA (US); Anthony Wayne Baker, Ridley Park, PA (US)

(73) Assignee: THE BOEING COMPANY, Arlington, VA (US)

( * ) Notice: Subject to any disclaimer, the term of this patent is extended or adjusted under 35 U.S.C. 154(b) by 385 days.

(21) Appl. No.: 17/491,634

(22) Filed: Oct. 1, 2021

(65) Prior Publication Data
US 2022/0230348 A1 Jul. 21, 2022

Related U.S. Application Data

(60) Provisional application No. 63/138,931, filed on Jan. 19, 2021.

(51) Int. Cl.
*G06K 9/00* (2022.01)
*G06T 7/70* (2017.01)

(52) U.S. Cl.
CPC ...... *G06T 7/70* (2017.01); *G06T 2207/30204* (2013.01)

(58) Field of Classification Search
CPC .......... G06T 2207/30204; G06T 2207/30208; G06T 7/70–77; G06T 7/30–38;
(Continued)

(56) References Cited

U.S. PATENT DOCUMENTS

| 8,396,282 B1 | 3/2013 | Huber et al. |
| 8,995,712 B2 | 3/2015 | Huang et al. |

(Continued)

FOREIGN PATENT DOCUMENTS

| CN | 111340857 A | 6/2020 |
| EP | 3 706 080 A1 | 9/2020 |

(Continued)

OTHER PUBLICATIONS

Extended European Search Report received for European Application No. 22180106.1, mailed on Jan. 4, 2023, 11 pages.
(Continued)

*Primary Examiner* — Atiba O Fitzpatrick
(74) *Attorney, Agent, or Firm* — ALSTON & BIRD LLP (57) ABSTRACT

Apparatuses and methods train a model and then use the trained model to determine a global three dimensional (3D) position and orientation of a fiduciary marker. In the context of an apparatus for training a model, a wider field-of-view sensor is configured to acquire a static image of a space in which the fiducial marker is disposed and a narrower field-of-view sensor is configured to acquire a plurality of images of at least a portion of the fiducial marker. The apparatus also includes a pan-tilt unit configured to controllably alter pan and tilt angles of the narrower field-of-view sensor during image acquisition. The apparatus further includes a control system configured to determine a transformation of position and orientation information determined from the images acquired by the narrower field-of-view sensor to a coordi- (Continued)

nate system for the space for which the static image is acquired by the wider field-of-view sensor.

20 Claims, 4 Drawing Sheets

(58) Field of Classification Search
CPC .......... G06T 7/20; G06T 7/262; G06T 7/207; G06T 7/33; G06T 7/337; G06T 7/344; G06T 7/37; G06T 2207/20081; G06T 2207/20084; G06T 7/80; G06T 7/85; G06T 7/90; G06T 7/97; G06T 7/292; H04N 13/111; H04N 13/246; H04N 23/69; H04N 23/695; G06K 9/6256; G06K 9/6257; G06K 9/6259; G06V 10/70; G06V 10/82; G06V 10/774–7796; G06N 3/02–126; G06N 20/00–20; G06F 18/214–2155; G06F 7/023; G06F 40/16
See application file for complete search history.

(56) References Cited

U.S. PATENT DOCUMENTS

| | | | |
|---|---|---|---|
| 10,373,336 B1 | 8/2019 | Islam et al. | |
| 10,839,557 B1 | 11/2020 | Arora et al. | |
| 11,688,100 B1* | 6/2023 | Sun | H04N 23/62 382/156 |
| 2014/0132729 A1 | 5/2014 | Foulk et al. | |
| 2017/0094251 A1 | 3/2017 | Wolke et al. | |
| 2017/0287166 A1 | 10/2017 | Claveau et al. | |
| 2018/0322657 A1 | 11/2018 | Dubout et al. | |
| 2019/0332096 A1 | 10/2019 | Porter et al. | |
| 2019/0364206 A1 | 11/2019 | Dal Mutto et al. | |
| 2020/0273138 A1 | 8/2020 | Chavez et al. | |
| 2020/0318946 A1* | 10/2020 | Wolke | G01J 4/04 |
| 2023/0086050 A1 | 3/2023 | Feldman et al. | |
| 2023/0090757 A1 | 3/2023 | Chen et al. | |

FOREIGN PATENT DOCUMENTS

| | | | |
|---|---|---|---|
| SG | 191452 A1 * | 7/2013 | |
| WO | WO 2019/045721 A1 | 3/2019 | |

OTHER PUBLICATIONS

Michel Sarkis et al., "Calibrating an Automatic Zoom Camera With Moving Least Squares," IEEE Transactions on Automation Science and Engineering, 6(3):492-503, (Jul. 2009).

Reg G. Willson, "Modeling and Calibration of Automated Zoom Lenses," Technical Report CMU-RI-TR-94-03, The Robotics Institute, Carnegie Mellon University, 189 pages, (Jan. 1994).

Shunyi Zheng et al., "Zoom lens calibration with zoom- and focus-related intrinsic parameters applied to bundle adjustment," ISPRS Journal of Photogrammetry and Remote Sensing, 102:62-72, (2015).

Extended European Search Report received for European Application No. 22178289.9, mailed on Dec. 9, 2022, 12 pages.

Alvarez, L. et al., "Accurate depty dependent lens distortion models: an application to planar view scenarios," J. Math Imaging Vis., 39:75-85, (Jan. 2011).

Byeon, M. et al., "Variational interference for 3-D localization and tracking of multiple targets using multiple cameras," IEEE Transactions on Neural Networks and Learning Systems, 30(11):3260-3274, (2019).

Byun et al., "Accurate control of a pan-tilt system based on parameterization of rotational motion," arXiv preprint arXiv: 1812. 00232, 2018.

Camera Calibration and 3D Reconstruction, https://docs.opencv.org/2.4/modules/calib3d/doc/camera_calibration_and_3d_reconstruction.htm.

Davis et al., "Calibrating pan-tilt cameras in wide-area surveillance networks," In Proceedings of the Ninth IEEE International Conference on Computer Vision, IEEE Computer Society, vol. 2, p. 144, 2003.

Ercan, A. et al., "Object tracking in the presence of occulusions using multiple cameras: A sensor network approach," ACM Transactions on Sensor Networks (TOSN), 9(2):1-36, (2013).

Lu, Z. et al., "Camera calibration method with focus-related intrinsic parameters based on the thin-lens model," Optics Express, 28(14):20858-20878, (Jul. 2020).

Wu, B. et al., "A flexible method for zoom lens calibration and modeling using a planar checkboard," Photogrammetric engineering and remote sensing, 79(6):555-571, (Jun. 2013).

Wu, Z. et al., "Keeping a pan-tilt-zoom camera calibrated," IEEE Transactions on Pattern Analysis and Machine Intelligence, 35(8): 994-2007, (2012).

You, Q. et al., "Real-time 3D Deep Multi-Camera Tracking," arXiv preprint arXiv:2003.11753.

Zhang, Z., "A flexible newtechnique for camera calibration," IEEE Transactions on Pattern Analysis and Machine Intelligence, 22(11): 1330-1334, (2000).

OpenCV Open Source Computer Vision, "Detection of ChArUco Boards," 5 pages, (May 16, 2021). [Retrieved from the Internet Dec. 12, 2023: <URL: https://docs.opencv.org/3.4/df/d4a/tutorial_charuco_detection.html>].

* cited by examiner

METHOD AND APPARATUS FOR DETERMINING A THREE-DIMENSIONAL POSITION AND POSE OF A FIDUCIAL MARKER

CROSS-REFERENCE TO RELATED APPLICATIONS

This application claims benefit of U.S. Provisional Application No. 63/138,931, filed Jan. 19, 2021, the entire contents of which are incorporated herein by reference.

TECHNOLOGICAL FIELD

An example embodiment relates generally determining a three-dimensional position and orientation of a fiducial marker and, more particularly, to determining the three-dimensional position and orientation of a fiducial marker utilizing a wider field-of-view sensor as well as a narrower field-of-view sensor supported by a pan-tilt unit.

BACKGROUND

A number of applications are dependent upon the determination of the position of a fiducial marker. However, the position of a fiducial marker alone may not be sufficient and, instead, six degree of freedom (DOF) pose information, that is, information defining the three-dimensional position and orientation, of the fiducial marker must be determined to locate and interact with the fiducial marker with sufficient precision. In this regard, the three-dimensional position and orientation may be defined in terms of x, y and z coordinates for the three-dimensional position and pitch, roll and yaw for the orientation.

For example, a fiducial marker may need to be identified, such as in terms of six DOF pose information, in conjunction with various manufacturing operations, such as manufacturing operations to be performed in an automated or robotic manner. For example, automated painting operations, drilling operations, cutting operations, finishing operations and other manufacturing operations frequently require the precise determination of the three-dimensional position and orientation of the various tools utilized by a robot. As such, a fiducial marker may be attached to the robot manipulator which engages the various tools. By precisely identifying the fiducial marker in terms of its three-dimensional position and orientation, the position and orientation of the robot manipulator and, in turn, the tools utilized by the robot may be determined, thereby allowing the manufacturing operations may be performed in precise positions. Further, movement required in relation to the performance of the manufacturing operations may be precisely performed utilizing closed loop control based upon the six DOF pose information for the fiducial marker.

Metrology techniques utilized to determine the six DOF pose information for a fiducial marker may require relatively expensive equipment, such as one or more laser range finders, projectors, etc. This equipment is generally not only expensive, but may be appropriate for only a limited number of tasks and oftentimes must be manually calibrated, thereby increasing both the time required to identify a fiducial marker and the training or experience required of a technician in order to calibrate the specialized equipment. Additionally, at least some of the equipment, such as the sensors, utilized by metrology techniques to determine the six DOF pose information of a fiducial marker must remain fixed in position following calibration. In this regard, a plurality of sensors, that is, a sensor wall, may be configured to obtain images of different portions of a space in which the fiducial marker is disposed. This constraint limits the utility of at least some of the equipment, particularly in instances in which a plurality of sensors are utilized in combination, since movement of the equipment following calibration will require that the calibration process be repeated, thereby extending the time required to identify a fiducial marker, such as in terms of the six DOF pose information.

Additionally, visual metrology, such as utilized in conjunction with the identification of a fiducial marker for manufacturing operations, generally requires a relatively high level of accuracy. As such, metrology techniques developed for other applications, such as for wide-area surveillance applications, that require less accuracy may be incapable of determining the six DOF pose information of a fiducial marker with the accuracy demanded by at least some applications, such as those involving manufacturing operations.

BRIEF SUMMARY

An apparatus and method are provided for training a model to determine a three dimensional (3D) position and orientation of a fiduciary marker in a global coordinate system. The method and apparatus of this example embodiment are configured to train the model in such a manner that the 3D position and orientation of the fiduciary marker may be determined with relatively high accuracy and in an efficient manner, such as in real time, in at least some embodiments. Further, the method and apparatus of this example embodiment may be implemented utilizing commercial sensors and may permit repositioning of the sensors following calibration, at least about pan and tilt axes, without a requirement for additional calibration, thereby increasing the ease with which a fiducial marker may be identified and its global 3D position and orientation accurately measured. In another example embodiment, a method and apparatus are provided for determining the 3D position and orientation of a fiducial marker by utilizing, for example, such a trained model.

In an example embodiment, an apparatus for training a model to determine a three-dimensional (3D) position and orientation of a fiducial marker is provided. The apparatus includes a wider field-of-view sensor configured to acquire a static image of a space in which the fiducial marker is disposed. The apparatus also includes a narrower field-of-view sensor configured to acquire a plurality of images of at least a portion of the fiducial marker. The apparatus further includes a pan-tilt unit configured to support the narrower field-of-view sensor and to controllably alter a pan angle and a tilt angle at which the narrower field-of-view sensor is positioned relative to the fiducial marker such that the narrower field-of-view sensor is configured to acquire images of at least a portion of the fiducial marker at different pan and tilt angles. The apparatus also includes a control system configured to determine a transformation of position and orientation information determined from the images acquired by the narrower field-of-view sensor to a coordinate system for the space for which the static image is acquired by the wider field-of-view sensor. In an example embodiment, the pan-tilt unit is configured to alter the pan and tilt angles at which the narrower field-of-view sensor is positioned so as to be able to capture images with the narrower field-of-view sensor throughout the entire sensor view of the wider field-of-view sensor.

The control system of an example embodiment is configured to determine the transformation by performing a training process. The training process includes collecting the plurality of images from the narrower field-of-view sensor, processing the images in which the fiducial marker is identified in each image and using the model to determine a transformation matrix for the transformation of the position and orientation information determined from the images acquired by the narrower field-of-view sensor to the coordinate system for the space in which the static image is acquired by the wider field-of-view sensor. In an example embodiment, the wider field-of-view sensor is configured to acquire a second static image of the space in which the fiducial marker is disposed after the fiducial marker has been repositioned. In this example embodiment, the narrower field-of-view sensor is configured to acquire a second plurality of images of at least a portion of the fiducial marker at different combinations of pan and tilt angles after the fiducial marker has been repositioned. The control system of this example embodiment is further configured to determine the transformation of position and orientation information determined from the second plurality of images acquired by the narrower field-of-view sensor to the coordinate system for the space for which the static images are acquired by the wider field-of-view sensor.

The control system of an example embodiment is configured to determine the transformation by rotating the position and orientation of the fiducial marker that is determined in a local coordinate system of the narrower field-of-view sensor about a pan axis and a tilt axis defined by the pan-tilt unit. The control system of this example embodiment may be further configured to determine the transformation by translating the position and orientation of the fiducial marker to determine into the local coordinate system of the narrower field-of-view sensor from an origin to the pan axis and the tilt axis defined by the pan-tilt unit. In this example embodiment, the control system may be further configured to determine the transformation by transforming from the local coordinate system at pan and tilt angles of 0° to the coordinate system for the space for which the static image is acquired by the wider field-of-view sensor. In an example embodiment, the control system is configured to determine the transformation by determining model parameters to minimize a loss function defining an error metric between a position and orientation of the fiducial marker in the coordinate system for the space for which the static image is acquired by the wider field-of-view sensor and in a local coordinate system of the narrower field-of-view sensor. The control system of an example embodiment is configured to determine the model parameters by evaluating an error metric between estimates of position and orientation from the wider field-of-view sensor and from the narrower field-of-view sensor using respective positions of 3D features of one or more fiducial markers in respective positions and orientations.

In another example embodiment, a method for training a model to determine a three dimensional position and orientation of a fiducial marker is provided. The method includes acquiring, with a wider field-of-view sensor, a static image of the space in which the fiducial marker is disposed. The method also includes sequentially positioning a narrower field-of-view sensor to have different combinations of a pan angle and a tilt angle relative to the fiducial marker. The method further includes acquiring, with the narrower field-of-view sensor, a plurality of images of at least a portion of the fiducial marker at a different pan and tilt angles. The method also includes determining a transformation of position and orientation information determined from the images acquired by the narrower field-of-view sensor to a coordinate system for the space for which the static image is acquired by the wider field-of-view sensor.

The method of an example embodiment determines the transformation by performing a training process. In this regard, the training process is performed by collecting the plurality of images from the narrower field-of-view sensor, processing the images in which the fiducial marker is identified in each image and using the model to determine a transformation matrix for transformation of the position and orientation information determined from the images acquired by the narrower field-of-view sensor to the coordinate system for the space for which the static image is acquired by the wider field-of-view sensor. In an example embodiment, the method also includes acquiring, with the wider field-of-view sensor, a second static image of the space in which the fiducial marker is disposed after the fiducial marker has been repositioned. The method of this example embodiment also includes acquiring, with the narrower field-of-view sensor, a second plurality of images of at least a portion of the fiducial marker at different combinations of pan and tilt angles after the fiducial marker has been repositioned. The method of this example embodiment further includes determining the transformation of position and orientation information determined from the second plurality of images acquired by the narrower field-of-view sensor to the coordinate system for the space for which the static images are acquired by the wider field-of-view sensor.

The method of an example embodiment determines the transformation by rotating a position and orientation of the fiducial marker determined in a local coordinate system of the narrower field-of-view sensor about a pan axis and a tilt axis defined by the pan and tilt unit. The method of this example embodiment may also determine the transformation by translating the position and orientation of the fiducial marker determined in the local coordinate system of the narrower field-of-view sensor from an origin to the pan axis and the tilt axis defined by the pan and tilt unit. The method of this example embodiment may also determine the transformation by transforming from the local coordinate system at pan and tilt angles of 0° to the coordinate system for the space for which the static image is acquired by the wider field-of-view sensor. In an example embodiment, the method determines the transformation by determining model parameters to minimize a loss function defining an error metric between a position and orientation of the fiducial marker in the coordinate system for the space for which the static image is acquired by the wider field-of-view sensor and in the local coordinate system of the narrower field-of-view sensor. The method of an example embodiment determines the model parameters by evaluating an error metric between estimates of position and orientation from the wider field-of-view sensor and from the narrower field-of-view sensor using respective positions of 3D features of one or more fiducial markers in respective positions and orientations.

In a further example embodiment, an apparatus is provided for determining a three dimensional position and orientation of a fiducial marker. The apparatus includes a wider field-of-view sensor configured to acquire a static image of a space in which the fiducial marker is disposed. The apparatus also includes a narrower field-of-view sensor configured to acquire an image of at least a portion of the fiducial marker and a pan-tilt unit configured to support the narrower field-of-view sensor and to controllably define a pan angle and a tilt angle at which the narrower field-of-view sensor is positioned relative to the fiducial marker such that the narrower field-of-view sensor is configured to acquire the image of at least a portion of the fiducial marker. The apparatus further includes a control system configured to utilize a transformation to determine, independent of any position information for the wider field-of-view and narrower field-of-view sensors, an estimate of the position and orientation of the fiducial marker in a coordinate system for the space for which the static image is acquired by the wider field-of-view sensor, based on the images acquired from the wider field-of-view and narrower field-of-view sensors viewing the fiducial marker and also based on the pan and tilt angles at which the narrower field-of-view sensor is positioned relative to the fiducial marker upon acquiring the image.

The control system of an example embodiment is further configured to determine a position and orientation of the fiducial marker in a local coordinate system of the narrower field-of-view sensor. In this example embodiment, the control system is configured to utilize the transformation to convert the position and orientation of the fiducial marker in the local coordinate system of the narrower field-of-view sensor to the position and orientation of the fiducial marker in the coordinate system for the space for which the static image is acquired by the wider field-of-view sensor based upon the pan angle and tilt angle of the pan-tilt unit.

In an example embodiment, the narrower field-of-view sensor is configured to acquire the image of at least a portion of the fiducial marker with more pixels representative of the fiducial marker than the static image acquired by the wider field-of-view sensor. The control system of an example embodiment is configured to determine the estimate of the position and orientation of the fiducial marker in real time with acquisition of the image of at least the portion of the fiducial marker by the narrower field-of-view sensor. In an example embodiment, the transformation is based upon model parameters determined to minimize the loss function defining an error metric between the position and orientation of the fiducial marker in the coordinate system for the space for which the static image is acquired by the wider field-of-view sensor and in the local coordinate system of the narrower field-of-view sensor.

In yet another example embodiment, a method if provided for determining a three-dimensional position and orientation of a fiducial marker. The method includes acquiring, with a wider field-of-view sensor, a static image of a space in which the fiducial marker is disposed. The method also includes controllably defining a pan angle and a tilt angle at which a narrower field-of-view sensor is positioned relative to the fiducial marker and acquiring, with the narrower field-of-view sensor, an image of at least a portion of the fiducial marker. The method further includes utilizing a transformation to determine, independent of any position information for the wider field-of-view and narrower field-of-view sensors, an estimate of the position and orientation of the fiducial marker in a coordinate system for the space for which the static image is acquired by the wider field-of-view sensor, based on the images acquired from the wider field-of-view and narrower field-of-view sensors viewing the fiducial marker and also based on the pan and tilt angles at which the narrower field-of-view sensor is positioned relative to the fiducial marker upon acquiring the image.

The method of an example embodiment also includes determining the position and orientation of the fiducial marker in a local coordinate system of the narrower field-of-view sensor. The method of this example embodiment utilizes the transformation to convert the position and orientation of the fiducial marker in the local coordinate system of the narrower field-of-view sensor to the position and orientation of the fiducial marker in coordinate system for the space for which the static image is acquired by the wider field-of-view sensor based upon the pan angle and the tilt angle.

In an example embodiment, the image of at least a portion of the fiducial marker acquired by the narrower field-of-view sensor includes more pixels representative of the fiducial marker than the static image acquired by the wider field-of-view sensor. In an example embodiment, the estimate of the position and orientation of the fiducial marker is determined in real time with the acquisition of the image of at least a portion of the fiducial marker by the narrower field-of-view sensor. The transformation of an example embodiment is based upon model parameters determined to minimize the loss function defining an error metric between the position and orientation of the fiducial marker in the coordinate system for the space for which the static image is acquired by the wider field-of-view sensor and in the local coordinate system of the narrower field-of-view sensor.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method and apparatus are provided for training a model to determine a three dimensional (3D) position and orientation, of a fiducial marker as well as a method and apparatus for utilizing the trained model to determine the 3D position and orientation of a fiducial marker. The accurate determination of the 3D position and orientation, also known as the six degree of freedom (DOF) pose information, of a fiducial marker may be utilized in conjunction with a wide variety of applications that are dependent upon the accurate identification of the fiducial marker.

Figure 1:
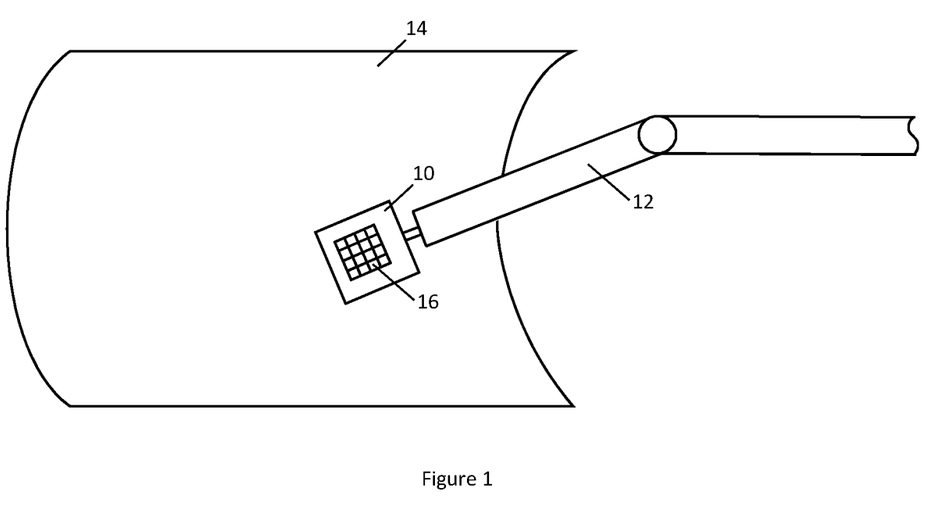
FIG. 1 is a perspective view of a workpiece and an associated paint head for which the six degree of freedom (DOF) pose information, namely, position and orientation, is determined in accordance with an example embodiment of the present disclosures.

For example, a number of manufacturing operations are dependent upon the accurate identification and locating of one or more objects. As shown in FIG. 1 by way of example, but not of limitation, the accurate determination of the position and orientation of a paint head 10 carried by a robotic arm 12 relative to workpiece 14 is useful during painting operations such that the workpiece or at least specific portions of the workpiece are appropriately painted while other portions of the workpiece remain unpainted and previously painted portions of the workpiece are not unnecessarily repainted. By accurately identifying the position and orientation of the paint head 10 relative to the workpiece 14, the proper portion of the workpiece may be painted in an efficient manner, thereby conserving resources during the manufacturing process. In this regard, as a result of the accurate determination of the position and orientation of the paint head 10 relative to the workpiece 14, paint is conserved by uniformly applying a coat of paint of a desired thickness, while not unnecessarily re-painting previously painted surfaces, thereby also avoiding undesirable increases in the weight of the aircraft. Further, by accurately determining the position and orientation of the paint head 10 relative to the workpiece 14 and correspondingly ensuring that all portions of the workpiece that are intended to be painted have, in fact, been painted, the resulting appearance of the workpiece may be improved along with the weather protection of the aircraft offered by the paint.

Although described above in conjunction with the accurate determination of the position of a paint head 10 relative to a workpiece 14, the method and apparatus of an example embodiment may also be utilized to accurately determine the position and orientation of any of a variety of objects in conjunction with other manufacturing operations including drilling operations, cutting operations, etc. Further, the method and apparatus of an example embodiment may be utilized in conjunction with the accurate determination of the position and orientation of an end effector, a robotic arm or an object, such as the 6 DOF pose information, in applications other than manufacturing.

Figure 2:
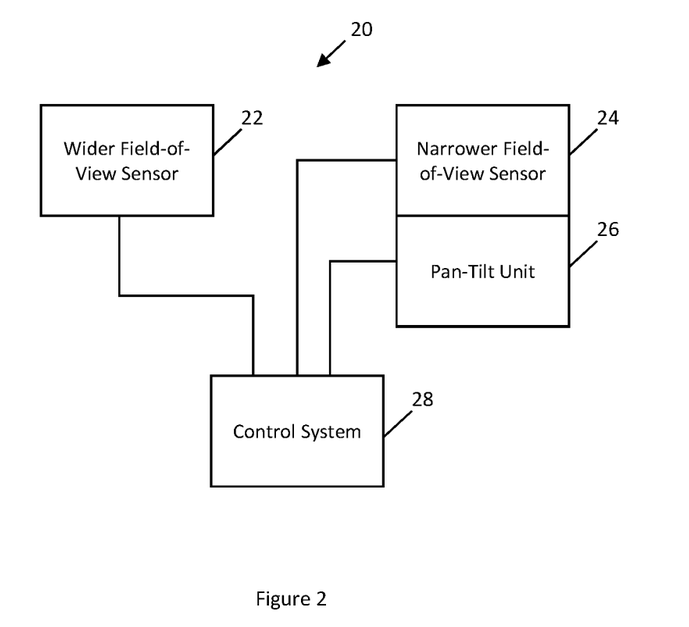
FIG. 2 illustrates an apparatus configured to determine the position and orientation of a fiducial marker in accordance with an example embodiment of the present disclosure.

The apparatus 20 of an example embodiment is depicted in FIG. 2. The apparatus 20 includes one or more wider field-of-view sensors 22 and one or more narrower field-of-view sensors 24. Although different types of sensors may be utilized in order to acquire images, the sensors of an example embodiment are cameras configured to acquire images of the respective fields of view. The wider field-of-view sensor 22 has a wider field-of-view than the narrower field-of-view sensor 24. The wider field-of-view sensor 22 has a shorter focal length than the narrower field-of-view sensor 24. Additionally, while the wider field-of-view sensor 22 and the narrower field-of-view of sensor 24 may have the same resolution, the narrower field-of-view sensor of one example embodiment has a greater resolution than the resolution of the wider field-of-view sensor. The wider field-of-view sensor 22 and the narrower field-of-view sensor 24 also generally disallow autofocus and have fixed zoom settings such that neither the focus distance nor the zoom setting changes.

The wider field-of-view sensor 22 may be fixed in position relative to the space in which the fiducial marker will be located. In this regard, the wider field-of-view sensor 22 is positioned such that the entire space in which the fiducial marker could potentially be located is acquired within the same image. For example, in an instance in which the fiducial marker could be positioned at any position upon a workpiece, the wider field-of-view sensor 22 is positioned such that a static image that is acquired includes the entire workpiece.

The narrower field-of-view sensor 24 is also generally positioned at a fixed position, such as a position having fixed x, y and z coordinates, although the narrower field-of-view sensor of another example embodiment may be configured to be controllably repositioned, such as by mounting the narrower field-of-view sensor upon a rail that facilitates translation of the narrower field-of-view sensor along a predefined path defined by the rail. As described below, however, the narrower field-of-view sensor 24 is configured to rotate about a pan axis and a tilt axis. The narrower field-of-view sensor 24 is configured to acquire an image of a portion of the same space that is acquired by the static image of the wider field-of-view sensor 22. However, the narrower field-of-view sensor 24 generally does not acquire an image that includes the entire space, but instead only that portion of the space in which the fiducial marker is located.

As shown in FIG. 2, the apparatus 20 of an example embodiment also includes a pan axis tilt unit 26. The pan-tilt unit 26 is configured to support the narrower field-of-view sensor 24 and to controllably and separately alter a pan angle and a tilt angle at which the narrower field-of-view sensor is positioned relative to the space and, more particularly, relative to the fiducial marker located within the space. As such, the narrower field-of-view sensor 24 is configured to acquire images of a portion of the space, such as the portion of the space within which the fiducial marker is disposed, at different combinations of pan and tilt angles. As the fiducial marker may be positioned at any of various positions throughout the space, the pan-tilt unit 26 is configured to controllably reposition the narrower field-of-view sensor 24 in terms of the pan and tilt angles such that the narrower field-of-view sensor is capable of viewing the entire space within the static image captured by the wider field-of-view sensor 22, even though the narrower field-of-view sensor is only capable of viewing a portion of the entire space at any particular combination of pan and tilt angles.

Figure 3:
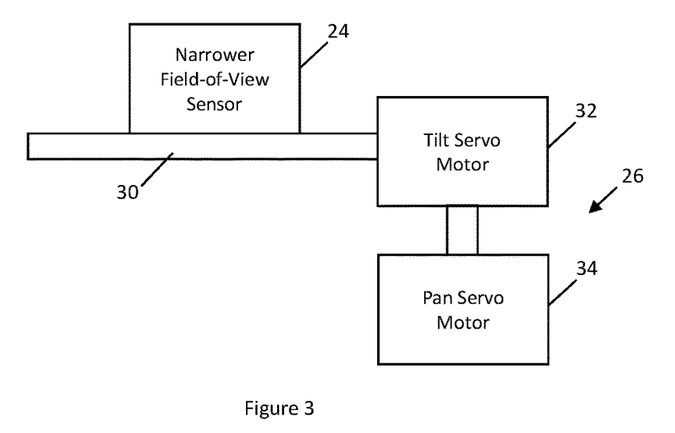
FIG. 3 depicts a pan-tilt unit and a narrower field-of-view sensor supported by the pan-tilt unit in accordance with an example embodiment of the present disclosure.

Although the pan-tilt unit 26 may be configured in different manners, the pan-tilt unit of an example embodiment is depicted in FIG. 3 to include a platform 30 and an associated tilt servo motor 32 that is configured to controllably alter the tilt angle of the platform and, in turn, the tilt angle of the narrower field-of-view sensor 24. Additionally, the pan-tilt unit 26 of this example embodiment may include a pan servo motor 34 configured to controllably alter the pan angle of the platform 30 and, in some embodiments, both the platform and the tilt servo motor 32. By altering the pan angle of the platform 30, the pan servo motor 34 also controllably alters the pan angle of the narrower field-of-view sensor 24.

The apparatus 20 of FIG. 2 also includes a control system 28. The control system 28 may be embodied in a variety of different manners including by a controller, a processor and any of a variety of computing devices, such as a personal computer, a computer workstation, a server or the like. In an example embodiment, the control system 28 is configured to determine a transformation of position and orientation information determined from the images acquired by the narrower field-of-view sensor 24 to a coordinate system, that is, a world coordinate system, for the space from which the static image is acquired by the wider field-of-view sensor 22. In this regard, the transformation may be at least partially defined by the model having a plurality of model parameters that serve to translate the position and orientation of the fiducial marker in a local coordinate system defined by the narrower field-of-view sensor 24 to the world coordinate system of the wider field-of-view sensor 22.

In another example embodiment, the control system 28 is configured to utilize the transformation, such as defined by a trained model, to determine an estimate of the position and orientation of a fiducial marker in the coordinate system for the space from which the static image is acquired by the wider field-of-view sensor 22. This determination of the estimate of the position and orientation of a fiduciary marker may be based on the images acquired from the wider field-of-view and narrower field-of-view sensors 22, 24 and also based on the pan and tilt angles at which the narrower field-of-view sensor is positioned relative to the fiducial marker upon acquiring the image. Thus, the control system 28 of this example embodiment is configured to determine the position and orientation of a fiducial marker in the world coordinate system in an efficient and reliable manner, such as in real time with a relatively small error, based on an image of a fiducial marker captured by the narrower field-of-view sensor 24 positioned at a particular combination of pan and tilt angles.

Figure 4:
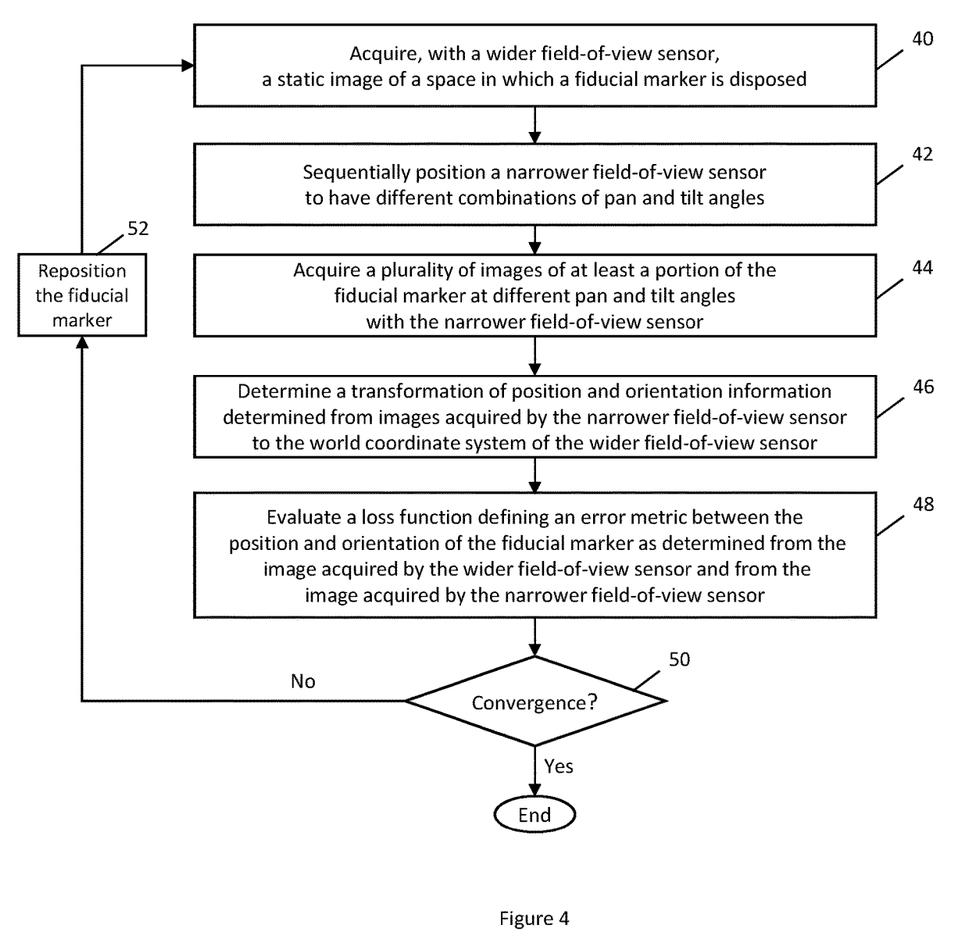
FIG. 4 is a flowchart for the operations performed, such as by the apparatus of FIG. 2, in order to train the model in order to determine the position and orientation of a fiducial marker in accordance in an example embodiment of the present disclosure.

Referring now to FIG. 4, the operations performed, such as by the apparatus 20 of FIG. 2, in order to train a model to determine the 3D position and orientation of a fiducial marker are depicted. The fiducial marker may be located coincident with an object for which the position and orientation is to be determined. As shown in FIG. 1, for example, the fiducial marker 16 may be placed on and carried by an object to be identified, such as by being carried by a paint head 10 in order to determine the position and orientation of the paint head relative to a workpiece 14.

Figure 5:
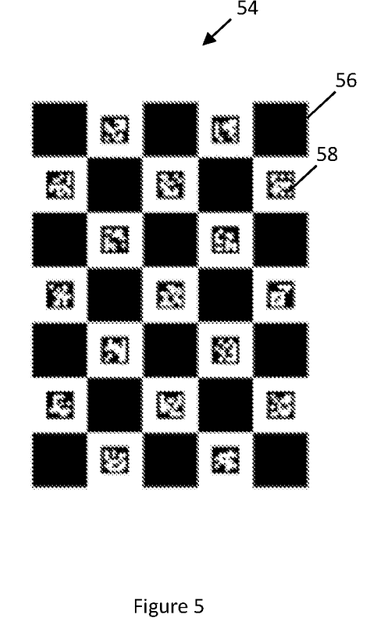
FIG. 5 illustrates a ChArUco board.

Various types of fiducial markers may be utilized including a ChArUco board. One example of a ChArUco board 54 is depicted in FIG. 5. A ChArUco board includes a ChArUco pattern which is a combination of a checkerboard 56 and a grid of ArUco markers 58. The checkerboard portions provide the structure required for the calibration and detection in order to determine position and orientation, while the ArUco markers identify specific sections of the ChArUco pattern. The ArUco markers therefore permit the ChArUco pattern to be utilized in instances in which only a partial or an occluded view of the ChArUco board is available since the ArUco markers permit the portion of the ChArUco board that is visible to be identified. While a ChArUco board may be utilized as a fiducial marker, other types of fiducial patterns may be utilized in other example embodiments.

After having positioned the fiducial marker, such as upon an object for which the position and orientation is to be determined, and as shown in block 40 of FIG. 4, the wider field-of-view sensor 22 is configured to acquire a static image of the space in which the fiducial marker is disposed including, for example, the entire space in which the fiducial marker could potentially be disposed. In an example embodiment in which the fiducial marker could be located anywhere upon a workpiece, the wider field-of-view sensor 22 is configured to acquire static image of a space that includes the entire workpiece, thereby necessarily including the position at which the fiducial marker will be disposed. In an example embodiment, the fiducial marker is located perpendicularly or nearly perpendicularly to the line-of-sight of the wider field-of-view sensor 22 to facilitate the accuracy with which the position and orientation of the fiducial marker is determined in the world coordinate system defined by the wider field-of-view sensor.

As shown in block 42 for a fiducial marker located at a first position, the pan-tilt unit 26 is configured to sequentially position the narrower field-of-view sensor 24 at different combinations of pan angle and tilt angle relative to the fiduciary marker. Although the pan-tilt unit 26 may be configured to sequentially position the narrower field-of-view sensor 24 to have any number of different combinations of the pan and tilt angles relative to the fiducial marker, the pan-tilt unit of one example embodiment is configured to sequentially position the narrower field-of-view sensor to have the plurality of different pan angles and a plurality of different tilt angles. Although the number of pan angles and the number of tilt angles may be different, the pan-tilt unit 26 of one embodiment is configured to sequentially position the narrower field-of-view sensor 24 to have the same number of different pan angles and different tilt angles, such as 16 different pan angles and 16 different tilt angles. Although the step size or angular increment between pan angles and tilt angles may be different, the pan-tilt unit 26 of an example embodiment is configured to alter the pan angle and the tilt angle such that the step size or angular increment between adjacent pan angles and adjacent tilt angles is equal.

Regardless of the number of different pan angles and tilt angles, the pan-tilt unit 26 is configured to determine the pan angles and the tilt angles such that at least a portion of the fiducial marker and, in one embodiment, at least half of the fiducial marker, is within the image acquired by the narrower field-of-view sensor 24. In an embodiment in which the fiducial marker has a ChArUco pattern, the pan-tilt unit 26 is configured to alter the pan angle to range between a smallest pan angle and a largest pan angle such that at the smallest pan angle approximately half of the ChArUco pattern is visible at the left side of the image captured by the narrower field-of-view sensor 24, while at the largest pan angle approximately half of the ChArUco pattern is visible at a right side of the image captured by the narrower field-of-view sensor. Similarly, the pan-tilt unit 26 of this example embodiment may be configured to alter the tilt angle to range between a smallest tilt angle and a largest tilt angle such that at the smallest tilt angle approximately half of the ChArUco pattern is visible at the bottom of the image captured by the narrower field-of-view sensor 24, while at the largest tilt angle approximately half of the ChArUco pattern is visible at the top of the image captured by the narrower field-of-view sensor.

As shown in block 44 of FIG. 4, the narrower field-of-view sensor 24 is configured to acquire a plurality of images of the fiducial marker at the different combinations for pan and tilt angles. Thus, the narrower field-of-view sensor 24 of an example embodiment is configured to acquire an image of the fiducial marker at each different combination of pan and tilt angles defined by the pan-tilt unit 26.

Figure 6:
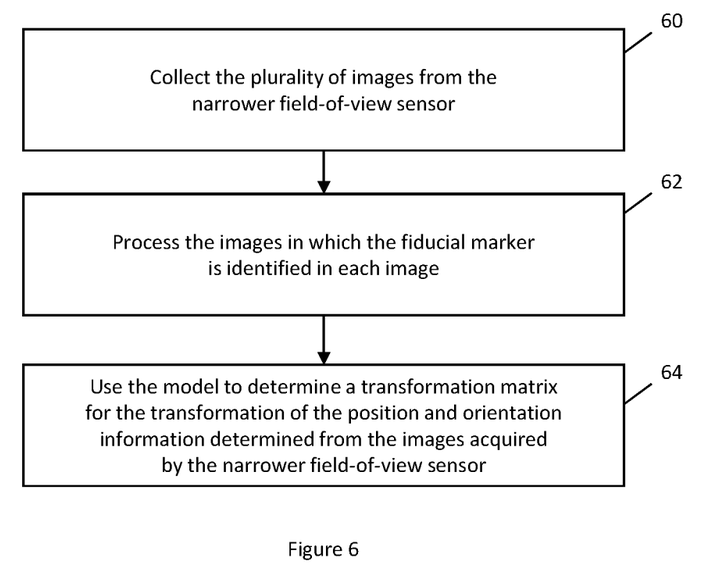
FIG. 6 is a flowchart of the operations performed, such as by the apparatus of FIG. 2, in order to implement a training process in accordance with an example embodiment of the present disclosure.

As shown in block 46 of FIG. 4, the control system 28 is configured to determine a transformation of the position and orientation information determined from the images acquired from the narrower field-of-view sensor 24 to a coordinate system, that is, a world coordinate system, for the space that is the subject of the static image acquired by the wider field-of-view sensor 22. The control system 28 of an example embodiment is configured to determine the transformation by performing a training process. As shown in FIG. 6, for example, the training process implemented by the control system 28 may be configured to collect a plurality of images from the narrower field-of-view sensor 24 and process the images in which the fiducial marker is identified in each image to determine the position and orientation information. See blocks 60 and 62. The control system 28 of this example embodiment is also configured to implement the training process by using the model to determine a transformation matrix for the transformation of the position and orientation information determined from the images acquired by the narrower field-of-view sensor 24 to the coordinate system for the space for which the static image is acquired by the wider field-of-view sensor 22. See block 64 of FIG. 6.

During this training phase, the position and orientation information determined from the images acquired by the narrower field-of-view sensor 24 is transformed into 6 DOF pose information expressed in the world coordinate system as determined from the static image captured by the wider field-of-view sensor 22. The 6 DOF pose information of the fiducial marker may be denoted $P_{World}$ and, in one embodiment, is represented by a matrix, such as a 4×4 matrix having a block, such as the top left 3×3 block, which is a rotation matrix representing the orientation of the fiducial marker and one or more other entries, such as the top three entries of the right most column of the 4×4 matrix, that represent the position of the fiducial marker, and the bottom row of the 4×4 matrix having all zeros (0.0) except for the last column of the bottom row which is 1.0.

Within each image acquired by the narrower field-of-view sensor 24 at a respective combination of pan and tilt angles, the 6 DOF pose information, that is, the position and orientation, of the fiducial marker in the local coordinate system defined by the narrower field-of-view sensor is extracted and is denoted as $P_{NFOV}$. In an example in which the fiducial marker includes a ChArUco pattern, the control system 28 is configured to extract the 6 DOF pose information from the image captured by the narrower field-of-view sensor 24 by first detecting the ArUco features and then refining those features to the checkerboard features between them prior to solving the Prospective-n-Point problem using a 3D model of the fiducial marker. The result of this extraction is six DOF pose information for the fiducial market in the local coordinate system defined by the narrower field-of-view sensor 24.

As noted above, after the position and orientation information is determined from the images acquired by the narrower field-of-view sensor 24, the control system 28 transforms the position and orientation information to the 6 DOF pose information in the world coordinate system. In relation to this transformation, a plurality of dynamic extrinsic parameters are unknown, but the intrinsic parameters of the wider field-of-view sensor 22 and the narrower field-of-view sensor 24 are known, e.g., predefined, including a representation of their focal length and distortion properties, among others. In order to effect the transform while working with a plurality of unknown dynamic extrinsic parameters, the control system 28 of an example embodiment is configured to implement a series of transforms.

In this regard, since the local coordinate system of the wider field-of-view sensor 22 is utilized as the world coordinate system, there is no transformation necessary from pose information $P_{WFOV}$ (namely, position and orientation) expressed in the local coordinate system of the wider field-of-view sensor and pose information $P_{World}$ expressed in the world coordinate system such that $P_{World}=P_{WFOV}$. In contrast, in order to express pose information $P_{NFOV}$ (position and orientation) from the local coordinate system of a narrower field-of-view sensor 24 in the world coordinate system of the wider field-of-view sensor 22, the control system 28 is configured to transform the pose information by a series of rotations and translations including the rotations about the pan and tilt axes defined by the pan-tilt unit 26.

The control system 28 of an example embodiment is configured to determine the transformation by rotating the position and orientation of the fiducial marker that is determined in the local coordinate system of the narrower field-of-view sensor 24 about a pan axis and a tilt axis defined by the pan-tilt unit 26. The control system 28 of this example embodiment is also configured to determine the transformation by translating the position and orientation of the fiducial marker that is determined in the local coordinate system of the narrower field of sensor 24 from an origin of this local coordinate system to the pan axis and to the tilt axis as defined by the pan-tilt unit 26. The control system of this example embodiment is also configured to determine the transformation by transforming from the local coordinate system at pan and tilt angles of 0° to the coordinate system for the space for which the static image is acquired by the wider field-of-view sensor 22, that is, the world coordinate system.

This transformation may be expressed in a different manner based upon the plurality of different transforms required to convert from the local coordinate system of the narrower field-of-view sensor 24 to the world coordinate system of the wider field-of-view sensor 22. In relation to the example embodiment of the apparatus 20 depicted in FIG. 2, a first transformation is defined between the narrower field-of-view sensor 24 and the tilt coordinate system. This first transformation includes a rotation $R_{NFOV \rightarrow Tilt}$ and a translation $T_{NFOV \rightarrow Tilt}$ from the narrower field-of-view sensor 24 to the tilt coordinate system. This first transformation from the narrower field-of-view sensor 24 to the tilt coordinate system includes 3 parameters associated with rotation, namely, yaw, pitch and roll, in the tilt coordinate system and 3 translation parameters, namely x, y and z, associated with translation to the tilt coordinate system. Each of these 6 parameters for this transformation is unknown. A second transformation is defined between the tilt coordinate system and the pan coordinate system including a rotation $R_{Tilt \rightarrow Pan}$ in terms of pitch and a translation $T_{Tilt \rightarrow Pan}$ in terms of x, y and z. Of these four parameters, the tilt angle, which corresponds to the pitch, is known, but the 3 translation parameters are unknown.

The transformation also includes a third transformation from the pan coordinate system to the base, that is, the support structure, e.g., floor, table, etc., for the apparatus 20. The third transformation includes a rotation $R_{Pan \rightarrow Base}$ in terms of yaw and a translation $T_{Pan \rightarrow Base}$. In some embodiments, the origins of the coordinate systems of the base and the pan-tilt unit 26 are coincident such that there is no translation between the pan coordinate system and the base, thereby leaving only one parameter, yaw, to be determined, with the translation $T_{Pan \rightarrow Base}$ being omitted. As the pan angle corresponds to yaw, the yaw parameter is known and the third transformation introduces no unknown parameters. Further, a fourth transformation from the base to the wider field-of-view sensor 22 includes a rotation $R_{Base \rightarrow World}$ and a translation $T_{Base \rightarrow World}$. This fourth transformation from the base to the wider field-of-view sensor 22 includes 3 parameters associated with rotation, namely, yaw, pitch and roll, and 3 translation parameters, namely x, y and z. Each of these 6 parameters for this transformation is static and is unknown. In this regard, the 6 parameters are static because the parameters do not change when the pan and tilt angles of the pan-tilt unit 26 change in the system.

As such, the overall transformation from the narrower field-of-view sensor 24 to the wider field-of-view sensor 22 includes 17 parameters of which two, that is, the pan and tilt angles, are known such that 15 parameters remain unknown, Taking into account these individual transformations, the overall transformation from the local coordinate system of the narrower field-of-view sensor 24 to the world coordinate system of the wider field-of-view senor 22 may be expressed as:

$$P_{World} = T_{Base \to WFOV} R_{Base \to WFOV}$$
$$R_{Pan \to Base} T_{Tilt \to Pan} R_{Tilt \to Pan} T_{NFOV \to Tilt} R_{NFOV \to Tilt} P_{NFOV}$$

wherein $R_{Base \to WFOV}$ $T_{Base \to WFOV}$ are arbitrary rigid transformations representing the position and orientation of the pan-tilt unit 26 in the wider field-of-view or world coordinates. In an example embodiment, each of the rotation R and translation T transformations above can be represented as a 4×4 matrix, respectively, where the top left 3×3 block of R is filled with a 3×3 rotation matrix, and the remaining entries of R filled with 0.0 except for the last row of the last column entry which is filled with 1.0, and where T is a 4×4 identity matrix except for the top three entries of the right most column, which are filled with the translation components in x, y, and z, respectively.

The transformation determined by the control system of an example embodiment may be expressed as:

$$P_{World} = E(pan, tilt; \omega) P_{NFOV}$$

wherein E(pan, tilt; ω) is a matrix representation, such as a 4×4 matrix representation, of the transformation from the local coordinate system of the narrower field-of-view sensor 24 to the world coordinate system of the wider field-of-view sensor 22 for particular angles of pan and tilt, obtained by combining the sequence of transformations using matrix multiplication operations. The vector ω represents the model parameters of the transformation, which will depend on the parameterization. In this regard, the model parameters ω are the union of the static parameters $\omega_s$ and the dynamic parameters $\omega_d$ of the model. As described in relation to the foregoing equation, $R_{Base \to WFOV}$ $T_{Base \to WFOV}$ are static parameters of the model, while $R_{Pan \to Base}$ $T_{Pan \to Base}$, $R_{Tilt \to Pan}$ $T_{Tilt \to Pan}$ and $R_{NFOV \to Tilt}$ $T_{NFOV \to Tilt}$ are dynamic parameters of the model. According to this parameterization, there are 15 (unknown) parameters of which 6 are static and 9 are dynamic.

The control system 28 of an example embodiment is configured to determine the transformation by determining model parameters to minimize a loss function defining an error metric between a position and orientation of the fiducial marker in a coordinate system, e.g., the world coordinate system, for the space related to the static image that is acquired by the wider field-of-view sensor 22 and a local coordinate system of the narrower field-of-view sensor 24. See block 48 of FIG. 4. In this regard, the control system 28 is configured to determine the transformation by calibrating the model to repeatedly minimize the disagreement between various six DOF pose estimates of the fiducial marker from the world coordinate system of the wider field-of-view sensor 22 and those from the local coordinate system of the narrower field-of-view sensor 24, by varying some or all of the model parameters. For example, the control system 28 may be configured to determine the model parameters by evaluating an error metric between pose estimates from the wider field-of-view sensor 22 and from the narrower field-of-view sensor 24 using respective positions of 3D features of one or more fiducial markers in respective poses. In an example embodiment, the error metric that is utilized between poses is an error metric between a point cloud consisting of the predicted fiducial feature positions in 3D, where the 3D feature locations can be derived by the fiducial marker design. In an example embodiment in which the fiducial marker is a ChaRuCo pattern, the chessboard corners of the ChaRuCo pattern can be used as the fiducial features, and their 3D locations can be derived from the pose of the fiducial marker. In other words, for two different poses $P_X$ and $P_Y$, $X_1, X_2, \ldots, X_n$ are the 3D feature positions for the first pose and $Y_1, Y_2, \ldots Y_n$ are the 3D feature positions for the second pose, where Xi and Yi, i=1~n, are vectors of 3D locations of the features. In an example embodiment, the error metric L utilized by the control system 28 is defined by the mean absolute error (MAE) as follows:

$$L_{MAE}(P_X, P_Y) = \frac{1}{n} \sum_i \|X_i - Y_i\|$$

In an alternative embodiment, the error metric L utilized by the control system 28 is defined as the root-mean-squared error (RMSE) as follows:

$$L_{RMSE}(P_X, P_Y) = \sqrt{\frac{1}{n} \sum_i \|X_i - Y_i\|^2}$$

Once the error metric has been defined, the relationship between the position and orientation information in the world coordinate system and the transformation of the position and orientation from the local coordinate system may be defined as:

$$P_{WFOV} = E(pan, tilt; \omega) P_{NFOV}$$

The control system 28 of this example embodiment is then configured to optimize, such as by minimizing, a loss function, such as $L_{MAE}$ or $L_{RMSE}$, which describes how far the foregoing equation is from being satisfied, averaged across all of the measurements of the fiducial marker. In this regard in which L defines the error metric between the six DOF pose information of the fiducial marker, the control system 28 of an example embodiment is configured to calibrate the model by finding all of the model parameters ω which minimize the following loss function in a single step:

$$\sum_{P_{World}} \frac{1}{m_{P_{World}}} \sum_{P_{WFOV}, P_{NFOV}} L(P_{WFOV}, E(pan, tilt; \omega) P_{NFOV})$$

wherein $m_{P_{World}}$ represents the number of images acquired by the wider field-of-view sensor 22 and the narrower field-of-view sensor 24, that is, $P_{WFOV}$ and $P_{NFOV}$, taken under different combinations of pan and tilt angles while the fiducial marker was in the pose $P_{World}$. The control system 28 may be configured to perform this minimization in various manners including in accordance with Levenberg-Marquardt optimization or with other nonlinear optimization algorithms such as the Broyden-Fletcher-Goldfarb-Shanno (BFGS) algorithm.

In an alternative embodiment, the control system 28 is configured as a two-step process. In a first step, the control system 28 is configured to solve for the model parameters by treating the poses of the fiduciary marker as parameters in the optimization step and then fitting them simultaneously while fitting the model parameters ω. In other words, $P_{world}$ is utilized n place of $P_{WFOV}$ and the control system then solves for $P_{World}$ while concurrently solving for the model parameters ω. In particular, the control system 28 of this example embodiment is configured to first determine or fit the dynamic parameters $\omega_d$, that is, the subset of the model parameters ω that are dynamic, and the fiducial poses ($P_{World}$) by optimizing, e.g., minimizing:

$$\sum_{P_{World}} \frac{1}{m_{P_{World}}} \sum_{P_{WFOV}, P_{NFOV}} L(P_{World}, E_d(\text{pan, tilt}; \omega_d) P_{NFOV})$$

with respect to the dynamic parameters $\omega_d$ of the model and to the fiducial poses ($P_{World}$). $E_d$(pan, tilt; $\omega_d$) is a 4×4 matrix representing the transformation of the dynamic model in which pan and tilt are known from the data collection and $\omega_d$ are the corresponding dynamic model parameters that are to be determined. While determining the dynamic parameters $\omega_d$ and the fiducial poses ($P_{World}$), the static model parameters $\omega_s$ may be set to a set of fixed values, such as 0 translations and 0 rotations. The dynamic parameters achieved in this step are denoted as $\tilde{\omega}_d$.

In the second step, the control system 28 of this example embodiment is then configured to determine or fit the static parameters $\omega_s$ of the model while the dynamic parameters $\omega_d$ are fixed to the previously determined values and foregoing equation is minimized while allowing only the static parameters to change as shown below:

$$\sum_{P_{World}} \frac{1}{m_{P_{World}}} \sum_{P_{WFOV}, P_{NFOV}} L(P_{WFOV}, E(\text{pan, tilt}; \tilde{\omega}_d; \omega_s) P_{NFOV})$$

wherein E is a 4×4 matrix representing the transformation of the model as before except that the dynamic model parameters associated with $\tilde{\omega}_d$ that were determined in the first step are fixed, and only the static model parameters $\omega_s$ are allowed to change during the minimization. The control system 28 of this example embodiment therefore effectively decomposes the calibration of the full network of the wider field-of-view sensor 22 and the pan-tilt mounted narrower field-of-view sensors 24 into the separate calibration of the pan-tilt mounted narrower field-of-view sensors and a subsequent calibration unifying all of the separate calibrations into a single coordinate system.

In an example embodiment, the control system 28 is also configured to determine a measure of the error, that is, the reprojection error between: (i) the transformation of the position and orientation information acquired in the local coordinate system by the narrower field-of-view sensor 24 to the world coordinate system of the wider field-of-view sensor 22 and (ii) the actual position and orientation of the fiducial marker as determined from the static image acquired by the wider field-of-view sensor. The control system 28 of this example embodiment is configured to analyze the measure of the error to determine whether the resulting error indicates that the model, including the model parameters, has converged. See block 50 of FIG. 4. In an instance in which the error satisfies a predefined error threshold, such as by being less than the predefined error threshold, the control system 28 of this example embodiment is configured to determine that the model has converged and the trained model is ready to be utilized to transform position and orientation information acquired by the narrower field-of-view camera 24 to the coordinate system of the wider field-of-view sensor 22. Conversely, in an instance in which the error is determined not to have converged, such as in an instance in which the control system 28 determines that the error fails to satisfy, such as by being greater than, a predefined error threshold, the fiducial marker is repositioned as shown in block 52, and this process is repeated in order to refine the model including the model parameters.

In this example embodiment, after the fiducial marker have been repositioned, such as relative to a workpiece, the wider field-of-view sensor 22 acquires a second static image of the space in which the fiducial marker is disposed and the narrower field-of-view sensor 24 acquires a plurality of images of at least a portion of the fiducial marker at different combinations of pan and tilt angles. The control system 28 of this example embodiment is then configured to determine the transformation of position and orientation information determined from the second plurality of images acquired by the narrower field-of-view sensor 24 to the coordinate system for the space for which the static images are acquired by the wider field-of-view sensor 22. This process may be repeated one or more additional times until the resulting error is determined by the control system 28 to satisfy the predefined error threshold, thereby demonstrating convergence of the trained model.

Figure 7:
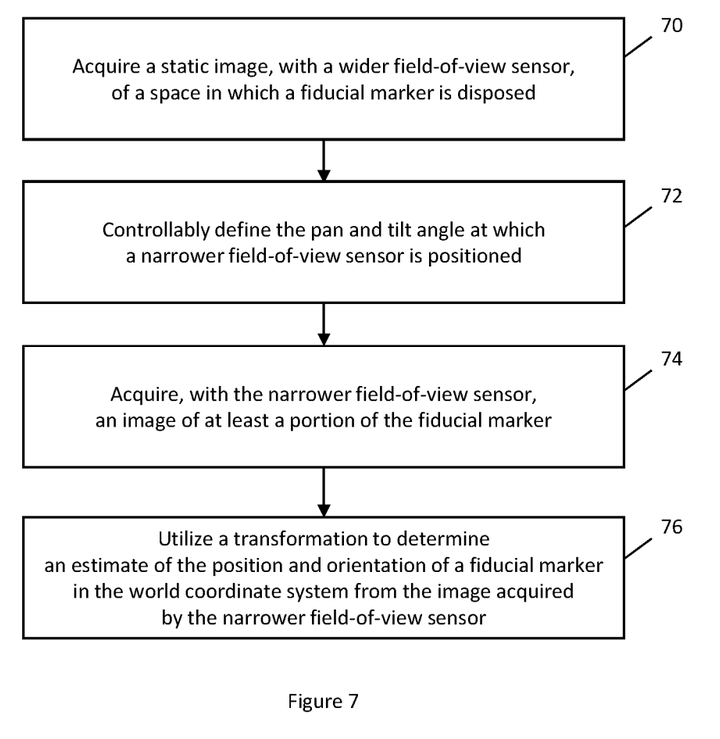
FIG. 7 is a block diagram of the operations performed, such as by the apparatus of FIG. 2, in order to determine the position and orientation of a fiducial marker utilizing a trained model in accordance with an example embodiment of the present disclosure.

Once the model has been trained, such as described above in conjunction with FIG. 4, the control system 28 is configured to utilize the model to determine the 3D position and orientation of a fiducial marker and, in turn, an object, such as a robot manipulator, upon which the fiducial marker is mounted. In some embodiments, a larger fiducial marker, such as a larger ChaRuCo pattern, may be utilizing during the training phase to increase the accuracy of the model than is used following the training phase during use of the model to determine the 3D position and orientation of the fiducial marker. As shown in block 70 of FIG. 7, the wider field-of-view sensor 24 of this example embodiment is configured to acquire a static image of the space in which the fiducial marker is disposed. The pan-tilt unit 26 is configured to support the narrower field-of-view sensor 24 and to controllably define the pan and tilt angles at which the narrower field-of-view is positioned relative to the fiducial marker such that at least a portion of the fiducial marker is within the field-of-view of the narrower field-of-view sensor. See block 72. While at the pan and tilt angles as defined by the pan-tilt unit 26, the narrower field-of-view sensor 24 is configured to acquire an image of at least a portion of the fiducial marker. See block 74. Unlike the plurality of images of at least a portion of fiducial marker acquired at different pan and tilt angles during the training process, the narrower field-of-view sensor 24 of this example embodiment need only acquire a single image of at least a portion of the fiducial marker, although more images may be acquired in other embodiments. Additionally, the control system 28 need not be recalibrated after having moved the narrower field-of-view sensor 24, thereby improving the efficiency of the apparatus 20.

The control system 28 of this example embodiment is configured to utilize the transformation defined by the trained model to determine an estimate of the position and orientation of the fiducial marker and, in turn, the object that carries the fiducial marker in the coordinate system, e.g., the world coordinate system, for the space for which the static image is acquired by the wider fielded view sensor 22. See block 76 of FIG. 7. This estimate of the position and orientation of the fiducial marker is based on the images acquired from the wider field-of-view sensor 22 and the narrower field-of-view sensor 24 viewing the fiducial marker and also based on the pan and tilt angles at which the narrower field-of-view sensor is positioned relative to the fiducial marker upon acquiring the image. However, the transformation utilized by the control system 28 is independent of any position information for the wider field-of-view sensor 22 and the narrower field-of-view sensor 24. Thus, the control system 28 need not know the position of the wider field-of-view and narrower field-of-view sensors 22, 24 in order to determine the position and orientation of the fiducial marker within the world coordinate system.

In an example embodiment, the control system 28 is first configured to detect the pattern of the fiducial marker, such as by utilizing the OpenCV library of vision functions, and to then determine the position and orientation of the fiducial marker in the local coordinate system of the narrower field-of-view sensor 24. In this example embodiment, the control system 28 is then configured to utilize the transformation, based upon the trained model, to convert the position and orientation of the fiducial marker from the local coordinate system of the narrower field-of-view sensor 24 to the position and orientation to the fiducial marker in the coordinate system, e.g., the world coordinate system, for the space for which the static image is acquired by the wider field-of-view sensor 22 based upon the pan and tilt angles of the pan-tilt unit 26.

Because of the narrower field-of-view in, some embodiments, the greater resolution of the narrower field-of-view sensor 24 relative to the wider field-of-view sensor 22, the narrower field-of-view sensor is configured to acquire the image of at least a portion of fiducial marker with more pixels being representative of the fiducial marker than the static image acquired by the wider field-of-view sensor. By placing more pixels on the fiducial marker, the position and orientation of the fiducial marker may be more accurately and reliably determined by reference to the image acquired by the narrower field-of-view sensor 24. Thus, the fusion of the information extracted from the images acquired by the wider field-of-view sensor 22 and the narrower field-of-view sensor 24 allows the apparatus 20 to place more pixels on the fiducial marker with the narrower field-of-view sensor while maintaining a constant, full view of the space with the wider field-of-view sensor. In addition, by utilizing the trained model having model parameters that were determined to minimize a loss function defining an error metric between the position and orientation of a fiducial marker in the world coordinate system of the wider field-of-view sensor 22 and in the local coordinate system of the narrower field-of-view sensor 24, the control system 28 of an example embodiment is configured to determine the estimated position and orientation of the fiducial marker in real time with the acquisition by the image of at least the portion of fiducial marker by the narrower field-of-view sensor. Thus, the transformation provided by the apparatus 20 of this example embodiment is both computationally efficient and capable of being performed in a timely manner.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An apparatus for training a model to determine a three dimensional (3D) position and orientation of a fiducial marker, the apparatus comprising:
a wider field-of-view sensor configured to acquire a static image of a space in which the fiducial marker is disposed;
a narrower field-of-view sensor configured to acquire a plurality of images of at least a portion of the fiducial marker;
a pan-tilt unit configured to support the narrower field-of-view sensor and to controllably alter a pan angle and a tilt angle at which the narrower field-of-view sensor is positioned relative to the fiducial marker such that the narrower field-of-view sensor is configured to acquire images of the fiducial marker at different pan and tilt angles; and
a control system configured to determine a transformation of position and orientation information determined from the images acquired by the narrower field-of-view sensor to a coordinate system for the space for which the static image is acquired by the wider field-of-view sensor, wherein the control system is configured to determine the transformation by determining model parameters to minimize a loss function defining an error metric between a position and orientation of the fiducial marker in a coordinate system for the space for which the static image is acquired by the wider field-of-view sensor and in a local coordinate system of the narrower field-of-view sensor.

2. The apparatus of claim 1, wherein the control system is configured to determine the transformation by performing a training process comprising collecting the plurality of images from the narrower field-of-view sensor, processing the images in which the fiducial marker is identified in each image, and using the model to determine a transformation matrix for the transformation of the position and orientation information determined from the images acquired by the narrower field-of-view sensor to the coordinate system for the space for which the static image is acquired by the wider field-of-view sensor.

3. The apparatus of claim 1, wherein the wider field-of-view sensor is configured to acquire a second static image of the space in which the fiducial marker is disposed after the fiducial marker has been repositioned, wherein the narrower field-of-view sensor is configured to acquire a second plurality of images of at least a portion of the fiducial marker at different combinations of pan and tilt angles after the fiducial marker has been repositioned, and wherein the control system is further configured to determine the transformation of position and orientation information determined from the second plurality of images acquired by the narrower field-of-view sensor to the coordinate system for the space for which static images are acquired by the wider field-of-view sensor.

4. The apparatus of claim 1, wherein the control system is configured to determine the transformation by rotating a position and orientation of the fiducial marker determined in a local coordinate system of the narrower field-of-view sensor to a pan coordinate system and a tilt coordinate system defined by the pan-tilt unit.

5. The apparatus of claim 4, wherein the control system is further configured to determine the transformation by translating the position and orientation of the fiducial marker determined in the local coordinate system of the narrower field-of-view sensor from an origin to the pan coordinate system and the tilt coordinate system defined by the pan-tilt unit.

6. The apparatus of claim 5, wherein the control system is further configured to determine the transformation by transforming from the local coordinate system at pan and tilt angles of 0° to the coordinate system for the space for which the static image is acquired by the wider field-of-view sensor.

7. A method for training a model to determine a three dimensional (3D) position and orientation of a fiducial marker, the method comprising:
acquiring, with a wider field-of-view sensor, a static image of a space in which the fiducial marker is disposed;
sequentially positioning a narrower field-of-view sensor to have different combinations of a pan angle and a tilt angle relative to the fiducial marker;
acquiring, with the narrower field-of-view sensor, a plurality of images of at least a portion of the fiducial marker at different pan and tilt angles; and
determining a transformation of position and orientation information determined from the images acquired by the narrower field-of-view sensor to a coordinate system, wherein determining the transformation comprises determining model parameters to minimize a loss function defining an error metric between a position and orientation of the fiducial marker in a coordinate system for the space for which the static image is acquired by the wider field-of-view sensor and in a local coordinate system of the narrower field-of-view sensor.

8. The method of claim 7, wherein determining the transformation comprises performing a training process, and wherein performing the training process comprises collecting the plurality of images from the narrower field-of-view sensor, processing the images in which the fiducial marker is identified in each image, and using the model to determine a transformation matrix for the transformation of the position and orientation information determined from the images acquired by the narrower field-of-view sensor to the coordinate system for the space for which the static image is acquired by the wider field-of-view sensor.

9. The method of claim 7, further comprising:
acquiring, with the wider field-of-view sensor, a second static image of the space in which the fiducial marker is disposed after the fiducial marker has been repositioned;
acquiring, with the narrower field-of-view sensor, a second plurality of images of at least a portion of the fiducial marker at different combinations of pan and tilt angles after the fiducial marker has been repositioned; and
determining the transformation of position and orientation information determined from the second plurality of images acquired by the narrower field-of-view sensor to the coordinate system for the space for which static images are acquired by the wider field-of-view sensor.

10. The method of claim 9, wherein determining the model parameters comprises minimizing the loss function in a single step so as to determine all of the model parameters.

11. The method of claim 9, wherein the model parameters comprise dynamic parameters and static parameters, and wherein determining the model parameters comprises:
determining the dynamic parameters and position and orientation of the fiducial marker in the coordinate system for the space for which the static image is acquired by the wider field-of-view sensor; and
determining the static parameters while the dynamic parameters remain fixed.

12. The method of claim 9, wherein determining the model parameters comprises repeatedly minimizing disagreement between a plurality of six degree of freedom estimates of position and orientation of the fiducial marker from the coordinate system for the space from which the static image is acquired by the wider field-of-view sensor and from the local coordinate system of the narrower field-of-view sensor by varying one or more of the model parameters.

13. The method of claim 9, wherein determining the model parameters comprises evaluating an error metric between estimates of position and orientation from the wider field-of-view sensor and from the narrower field-of-view sensor using respective positions of 3D features of one or more fiducial markers in respective positions and orientations.

14. An apparatus for determining a three dimensional (3D) position and orientation of a fiducial marker, the apparatus comprising:
a wider field-of-view sensor configured to acquire a static image of a space in which the fiducial marker is disposed;
a narrower field-of-view sensor configured to acquire an image of at least a portion of the fiducial marker;
a pan-tilt unit configured to support the narrower field-of-view sensor and to controllably define a pan angle and a tilt angle at which the narrower field-of-view sensor is positioned relative to the fiducial marker such that the narrower field-of-view sensor is configured to acquire the image of at least the portion of the fiducial marker; and
a control system configured to utilize a transformation, as defined by a trained model, to determine, independent of any position information for the wider field-of-view and narrower field-of-view sensors, an estimate of the position and orientation of the fiducial marker in a coordinate system for the space for which the static image is acquired by the wider field-of-view sensor, based on the images acquired from the wider field-of-view and narrower field-of-view sensors viewing the fiducial marker and also based on the pan and tilt angles at which the narrower field-of-view sensor is positioned relative to the fiducial marker upon acquiring the image,
wherein the control system is configured to determine the transformation by rotating a position and orientation of the fiducial marker determined in a local coordinate system of the narrower field-of-view sensor to a pan coordinate system and a tilt coordinate system defined by the pan-tilt unit.

15. The apparatus of claim 14, wherein the control system is further configured to determine a position and orientation of the fiducial marker in a local coordinate system of the narrower field-of-view sensor.

16. The apparatus of claim 15, wherein the control system is configured to utilize the transformation to convert the position and orientation of the fiducial marker in the local coordinate system of the narrower field-of-view sensor to the position and orientation of the fiducial marker in the coordinate system for the space for which the static image is acquired by the wider field-of-view sensor based upon the pan angle and the tilt angle of the pan-tilt unit.

17. The apparatus of claim 14, wherein the narrower field-of-view sensor is configured to acquire the image of at least the portion of the fiducial marker with more pixels representative of the fiducial marker than the static image acquired by the wider field-of-view sensor.

18. The apparatus of claim 14, wherein the control system is configured to determine the estimate of the position and orientation of the fiducial marker in real time with acquisition of the image of at least the portion of the fiducial marker by the narrower field-of-view sensor.

19. The apparatus of claim 14, wherein the control system is further configured to determine the transformation by determining model parameters to minimize a loss function defining an error metric between a position and orientation of the fiducial marker in the coordinate system for the space for which the static image is acquired by the wider field-of-view sensor and in a local coordinate system of the narrower field-of-view sensor.

20. The apparatus of claim 14, wherein the control system is configured to determine the model parameters by minimizing the loss function in a single step so as to determine all of the model parameters.

* * * * *